(12) United States Patent
Inagaki et al.

(10) Patent No.: US 8,386,624 B2
(45) Date of Patent: Feb. 26, 2013

(54) BROADCAST PROCESSING METHOD FOR NETWORK SYSTEM AND NETWORK SYSTEM

(75) Inventors: Junichi Inagaki, Kawasaki (JP); Masao Koyabu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1709 days.

(21) Appl. No.: 11/472,985

(22) Filed: Jun. 23, 2006

(65) Prior Publication Data

US 2007/0217450 A1    Sep. 20, 2007

(30) Foreign Application Priority Data

Mar. 14, 2006 (JP) .................. 2006-068895

(51) Int. Cl.
*G06F 15/16* (2006.01)
(52) U.S. Cl. .................................. 709/230
(58) Field of Classification Search .............. 709/230
See application file for complete search history.

(56) References Cited

U.S. PATENT DOCUMENTS

| | | | |
|---|---|---|---|
| 5,136,143 A | | 8/1992 | Kutner et al. |
| 6,055,599 A | * | 4/2000 | Han et al. ............. 710/317 |
| 6,223,242 B1 | * | 4/2001 | Sheafor et al. ........ 710/317 |
| 6,243,360 B1 | * | 6/2001 | Basilico .............. 370/231 |
| 6,789,173 B1 | * | 9/2004 | Tanaka et al. ......... 711/147 |

FOREIGN PATENT DOCUMENTS

| | | |
|---|---|---|
| JP | 5-244194 | 9/1993 |
| JP | 07-244648 | 9/1995 |
| JP | 2004-536372 | 12/2004 |
| WO | 02/069168 | 9/2002 |

OTHER PUBLICATIONS

Microsoft Proxy Server White Paper "Cache Array Routing Protocol and Microsoft Proxy Server 2.0" 1997 (Whole Document).*
J-Y Blanc, et al., "Desynchronized Communication Schemes on Distributed—AG Memory Architectures", 19900408; 19900408-19900412, vol. 2, Apr. 8, 1990, pp. 777-783.*
J-Y Blanc, et al., "Desynchronized Communication Schemes on Distributed Memory Architectures", 19900408; 19900408-19900412, vol. 2, Apr. 8, 1990, pp. 777-783.*
"Chinese Office Action", mailed by the Chinese State Intellectual Property Office on Jan. 15, 2010, corresponding to Chinese application No. 200610107521.2 with English translation.
J-Y Blanc, et al., "Desynchronized Communication Schemes on Distributed-Memory Architectures", 19900408; 19900408-19900412, vol. 2, Apr. 8, 1990, pp. 777-783.
J. Worringen, "Pipelining and overlapping for mpi collection operations", Local Computer Networks, 2003. LCN 2003, Proceedings 28th Annual IEEE International Conference on Oct. 20-24, 2003, pp. 548-557.
European Search Report issued on Dec. 3, 2008 in corresponding European Patent Application No. 06253424.3.

* cited by examiner

*Primary Examiner* — Ashok Patel
*Assistant Examiner* — Lawrence Cosby
(74) *Attorney, Agent, or Firm* — Fujitsu Patent Center

(57) ABSTRACT

A network system broadcast data from one node to a plurality of other nodes, which can decrease the time required for broadcast. A transfer source node divides the transfer data to be broadcasted, and transfers each divided data separately from the network adapters of the transfer source node to the network adapters of the other nodes, and the other nodes transfer the received data to the network adapters of the other nodes other than the transfer source node. Since more nodes (network adapters) can participate in data transfer in the second data transfer, high-speed transfer processing can be implemented, and the transfer processing time for broadcast can be decreased.

12 Claims, 10 Drawing Sheets

| DESTINATION ADDRESS | TRANSMISSION SOURCE ADDRESS | FRAME TYPE | DATA | FRAME CHECKSUM |
|---|---|---|---|---|

P R I O R   A R T

BROADCAST PROCESSING METHOD FOR NETWORK SYSTEM AND NETWORK SYSTEM

CROSS-REFERENCE TO RELATED APPLICATIONS

This application is based upon and claims the benefit of priority from the prior Japanese Patent Application No. 2006-68895, filed on Mar. 14, 2006, the entire contents of which are incorporated herein by reference.

BACKGROUND OF THE INVENTION

1. Field of the Invention

The present invention relates to a broadcast processing method for performing broadcast from one node to a plurality of other nodes in a network system in which a plurality of nodes are connected via a network, and to the network system, and more particularly to a broadcast processing method for a network system for efficiently broadcasting using a plurality of network adapters in each node, and to the network system.

2. Description of the Related Art

As higher speeds for computer systems are demanded, a network type computer system, in which a plurality of nodes including computers is installed and is connected via the network, has been proposed. In the field of parallel computers, for example, data is computed in parallel by a plurality of nodes, and the processed data is exchanged via the network. Such parallel computers have several hundred-several thousand nodes if the scale becomes large.

In such a network system, the data of one node is transferred to a plurality of other nodes via the network. This is called "broadcast processing". In this broadcast processing, mass data is sometimes transferred, and decreasing the transfer processing time is desired.

FIG. 11 and FIG. 12 are diagrams depicting a broadcast processing of a first conventional network system. As FIG. 11 shows, a plurality of (four in this case) of nodes 100, 101, 102 and 103 are connected via a network, which is not illustrated. Each of these nodes 100, 101, 102 and 103 has a plurality (three in this case) of network adapters 110A, 110B and 110C to enable parallel transfers.

If one node 100 broadcasts data to the other three nodes 101, 102 and 103 in this configuration, all transfer data is transferred from the network adapters 110A, 110B and 110C of the node 100 to the corresponding network adapters 110A, 110B and 110C of each node 101, 102 and 103 in parallel.

For example, as shown in FIG. 12, if the transfer data of 12 blocks D0 to D11 is transferred from the node 100 to the other three nodes 101, 102 and 103, the 12 blocks D0 to D11 are transferred from the network adapter 110A of the node 100 to the network adapter 110A of the node 101, from the network adapter 110B of the node 100 to the network adapter 110B of the node 102, and from the network adapter 110C of the node 100 to the network adapter 110C of the node 103 respectively.

In this way, according to the first prior art, the time required for broadcast processing is decreased by parallel transfer for each node 100, 101, 102 and 103 to have a plurality of transfer channels (network adapters).

FIG. 13 and FIG. 14 are diagrams depicting a broadcast processing of a second conventional network system. According to this method, when data is broadcasted among each node having a plurality of network adapters, just like FIG. 11, a transmission source node 100 divides the transmission data and transfers it from each network adapter.

In other words, as FIG. 13 and FIG. 14 show, the transmission source node 100 divides the transmission data blocks D0 to D11 into three, and the divided blocks are transferred from the three network adapters 110A, 110B and 110C of the node 100 to the network adapters 110A, 110B and 110C of the node 102, as shown in sign (1).

Since there are two nodes which hold the transmission data, the transmission node 100 transfers each of the data blocks divided into three from the three network adapters 110A, 110B and 110C of the node 100 to the network adapters 110A, 110B and 110C of the node 101, as shown in sign (2). At the same time, the node 102 transfers each of the divided data blocks received from the node 100 from the three network adapters 110A, 110B and 110C of the node 102 to the network adapters 110A, 110B and 110C of the node 104, as shown in sign (3).

If the transfer data length is long, the broadcast processing time is normally in proportion to the data volume that propagates the network, so a processing time to transfer 12 blocks is required for the first prior art, but in the second prior art, the data blocks are divided into three and transferred twice, so a transfer time for four blocks is required twice, in other words, a processing time becomes only $8/12 = 2/3$ of the processing time of the first prior art (e.g. Japanese Patent Application Laid-Open No. H7-244648).

In the case of the second prior art, however, a copy of the transfer data of the broadcast source node 100 is held by the node 102 in the first transfer, and a full transfer data is transferred from two nodes at the transfer source and copy destination, that is nodes 100 and 102, to two nodes 101 and 103 in the second transfer for broadcasting the data.

Therefore in the second prior art, the broadcast processing time is limited, and in particular when the data transfer length is long, it is difficult to decrease the broadcast processing time.

SUMMARY OF THE INVENTION

With the foregoing in view, it is an object of the present invention to provide a broadcast processing method for a network system, for decreasing the broadcast processing time, and the network system.

It is another object of the present invention to provide a broadcast processing method for a network system, for improving the performance of parallel calculation by decreasing the broadcast processing time, and the network system.

It is still another object of the present invention to provide a broadcast processing method for a network system, for decreasing the broadcast processing time even if the transfer data length is long, and the network system.

To achieve these objects, the network system of the present invention is a network system having three or more nodes each of which has a plurality of network adapters and a cross bar switch for connecting the network adapters of each of the nodes. And one of the nodes divides data to be transferred to the plurality of other nodes into a plurality of data, and transfers each of the divided data to the plurality of other nodes via a different network adapter respectively, and each of the plurality of other nodes which received the divided data transfers the received divided data to other nodes which do not receive the divided data via the network adapters.

The broadcasting processing method of the present invention is a broadcast processing method for a network system for broadcasting data from one node, having a plurality of network adapters, to a plurality of other nodes each of which has a plurality of network adapters, having a step of the one node dividing data to be transferred to the plurality of other nodes into a plurality of data, a first step of transferring each of the divided data from the one node to the plurality of other nodes via a different network adapter respectively, and a second step of transferring the received divided data from each of the plurality of other nodes which received the divided data to other nodes which do not receive the divided data via the network adapters.

In the present invention, it is preferable that each of the plurality of other nodes receives the divided data from the one node and transfers the previously received divided data to other nodes which do not receive the divided data via the network adapters.

Also in the present invention, it is preferable that the one node divides the data to be transferred by a divisor according to the number of network adapters to create the divided data.

Also in the present invention, it is preferable that the one node transfers the divided data to the plurality of nodes of which number is the same as the number of network adapters.

Also in the present invention, it is preferable that the one node divides the data by a divisor according to the number of the network adapters and the number of times of transfer, to create the divided data.

Also in the present invention, it is preferable that each of the plurality of other nodes transfer the received divided data to other nodes which do not receive the divided data via a network adapter which is predetermined among the plurality of nodes so as to prevent the overlap use of the network adapters.

Also in the present invention, it is preferable that the number of the plurality of other nodes is three or more.

Also in the present invention, it is preferable that each of the network adapters is connected with a cross bar switch via a network.

Also in the present invention, it is preferable that each of the nodes has at least a CPU, a memory and the plurality of network adapters.

Also in the present invention, it is preferable that each of the plurality of nodes has a parallel computer system for executing parallel calculation.

According to the present invention, the node at the transfer source divides the transfer data to be broadcasted, and the transfer source node transfers each of the divided data separately to a plurality of other nodes, then a node which received the divided data transfers the received data to nodes other than the transfer source node. Therefore more nodes (network adapters) can participate in data transfer in the second data transfer, high-speed transfer processing can be implemented, and the transfer processing time during broadcast can be decreased.

DESCRIPTION OF THE PREFERRED EMBODIMENTS

Embodiments of the present invention will now be described in the sequence of network system configuration, first embodiment, second embodiment, third embodiment and other embodiments, but the present invention is not limited to these embodiments.

Network System Configuration

Figure 1:
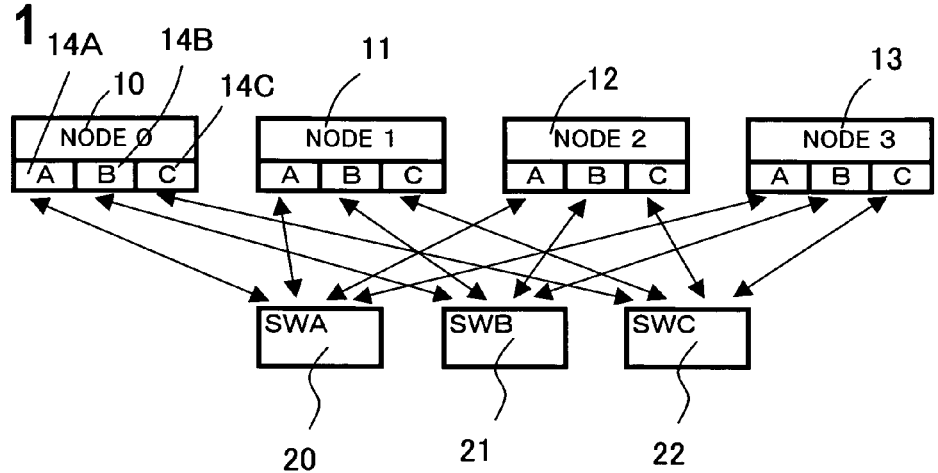
FIG. 1 is a block diagram depicting a network system according to an embodiment of the present invention.
Figure 2:
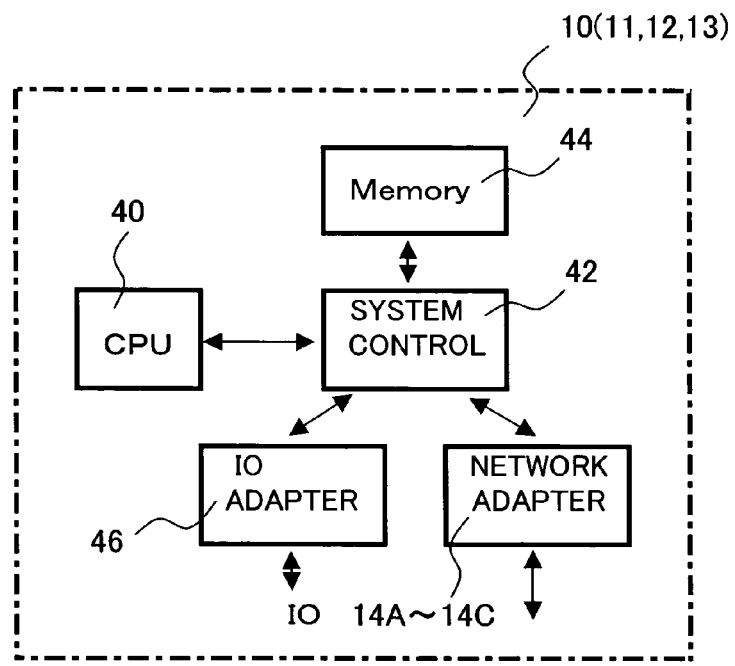
FIG. 2 is a block diagram depicting the node in FIG. 1.
Figures 3, 4:
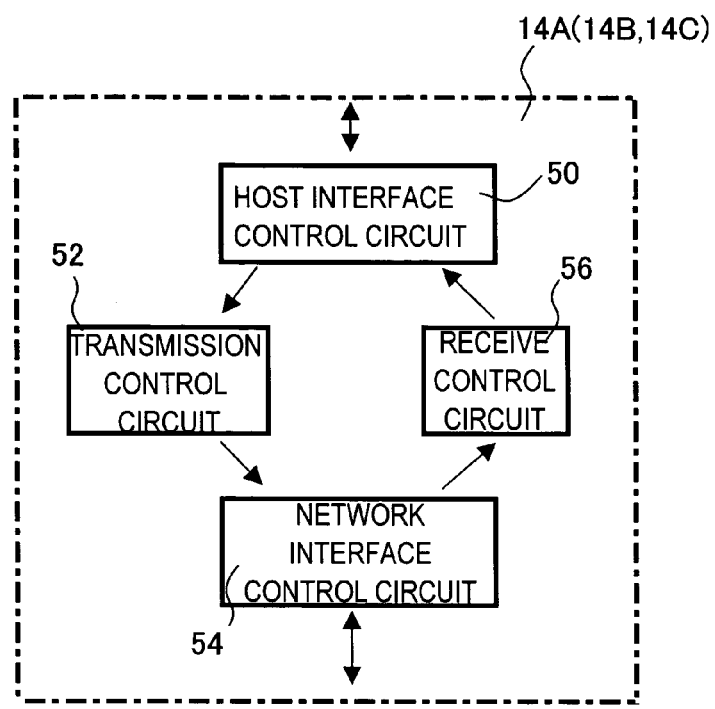
FIG. 3 is a block diagram depicting the network adapter in FIG. 1 and FIG. 2.
FIG. 4 is a diagram depicting the format of the transfer frame in FIG. 1.

FIG. 1 is a block diagram depicting an embodiment of the network system of the present invention, FIG. 2 is a block diagram depicting the node in FIG. 1, FIG. 3 is a block diagram depicting the network adapter in FIG. 1 and FIG. 2, and FIG. 4 is a diagram depicting a frame format of the network system in FIG. 1.

As FIG. 1 shows, the network system has a plurality (four in this case) of nodes 10, 11, 12 and 13 and three cross bar switches (SWA, SWB and SWC in figures) 20, 21 and 22. Each node 10, 11, 12 and 13 has three network adapters (A, B and C in figures) 14A, 14B and 14C.

Since each node 10, 11, 12 and 13 has three network adapters 14A, 14B and 14C, three cross bar switches 20, 21 and 22 are installed. In other words, each of the network adapters 14A, 14B and 14C of each node 10, 11, 12 and 13 is connected to a corresponding cross bar switch 20, 21 and 22.

As FIG. 2 shows, this node 10 (11, 12, 13) is a computer where a CPU 40, memory 44, IO adapter 46 and the above mentioned network adapters 14A to 14C are connected via a system controller 42. The number of CPUs 40, memories 44 and IO adapters 46 may be more than one according to the processing capability required for the node.

As FIG. 3 shows, the network adapter 14A (14B, 14C) in FIG. 1 and FIG. 2 is comprised of a host interface control circuit 50 which is connected to a system controller 42, a transmission control circuit 52, a network interface control circuit 54 which is connected to the cross bar switches 20, 21, and 22, and a receive control circuit 56. The network adapter 14A (14B, 14C) is in-charge of the data communication between nodes.

When data is transferred between nodes via the network adapter 14A (14B, 14C), communication is performed in the frame format shown in FIG. 4. The frame format shown in FIG. 4 is a frame format to be used for Ethernet™, and is comprised of a destination address, transmission source address, frame type (e.g. command type, data size), data, and frame checksum (e.g. CRC (Cyclic Redundancy Code)). The data length (size) of the data area is variable, and data to be transferred between nodes is divided into a plurality of frames, if necessary, and transferred.

First Embodiment

Figure 5:
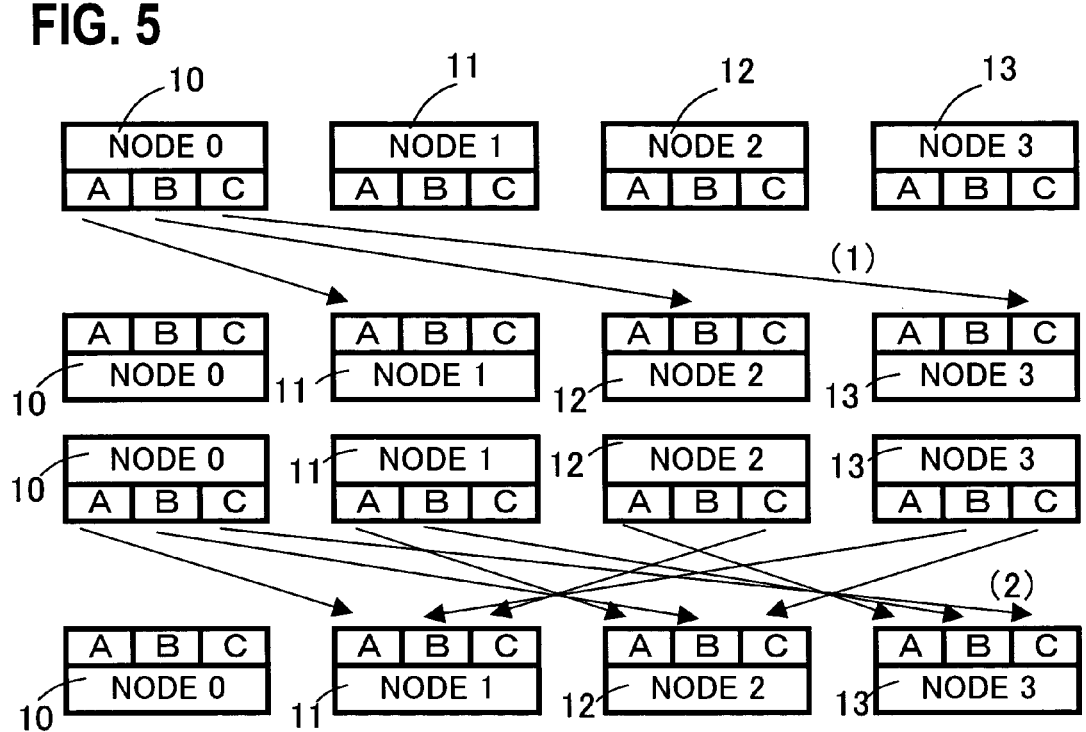
FIG. 5 is a diagram depicting the broadcast processing according to the first embodiment of the present invention.
Figure 6:
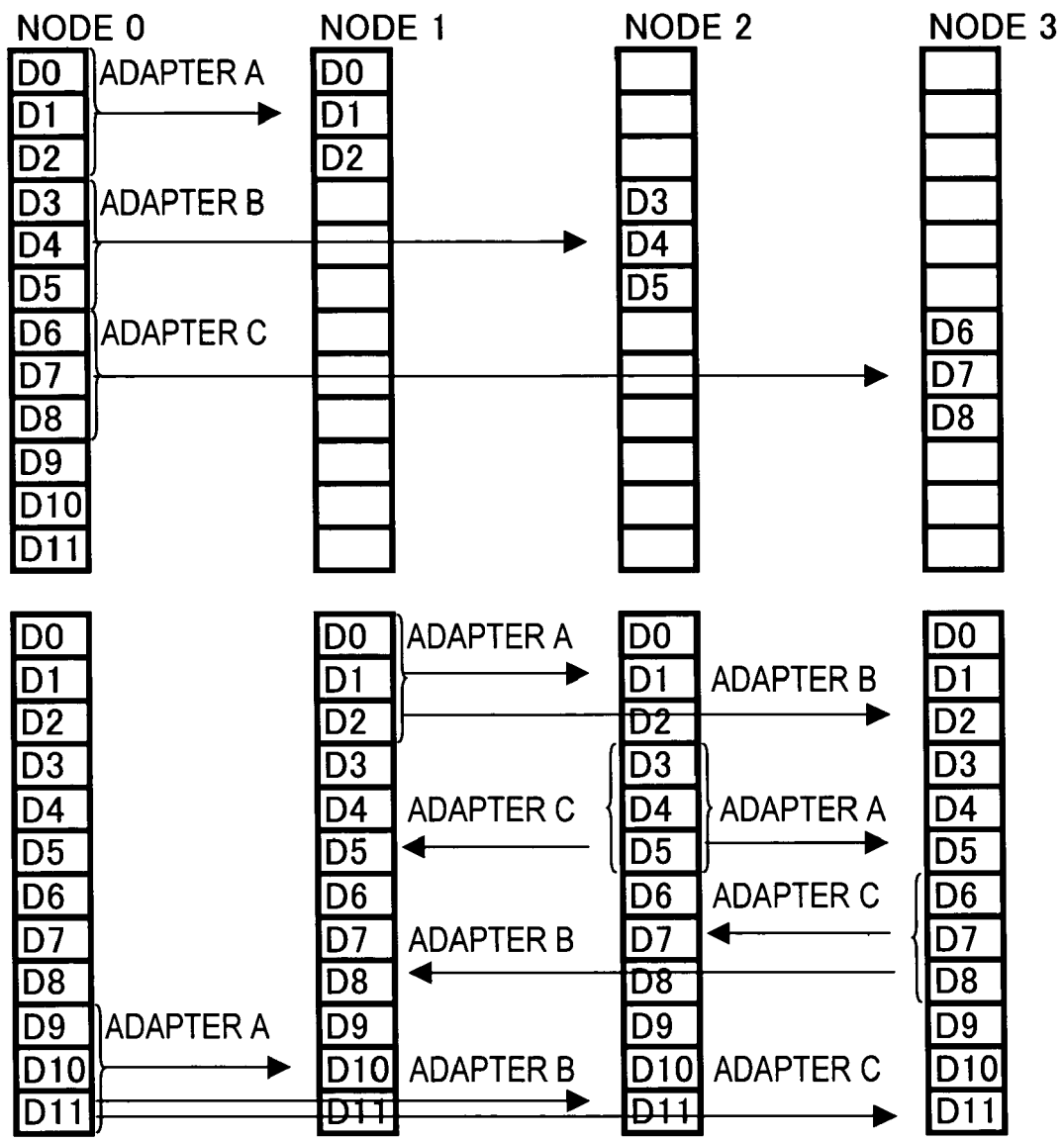
FIG. 6 is a diagram depicting the data flow according to the first embodiment in FIG. 5.
Figure 7:
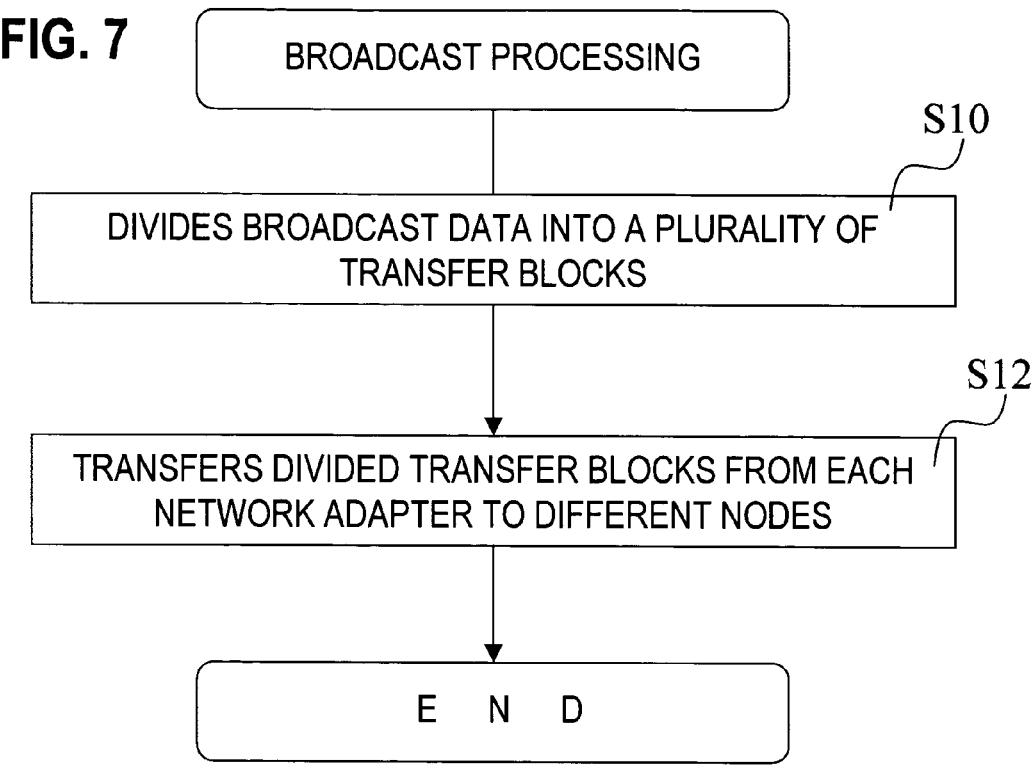
FIG. 7 is a flow chart depicting the processing of the transfer source node according to the first embodiment in FIG. 5.
Figure 8:
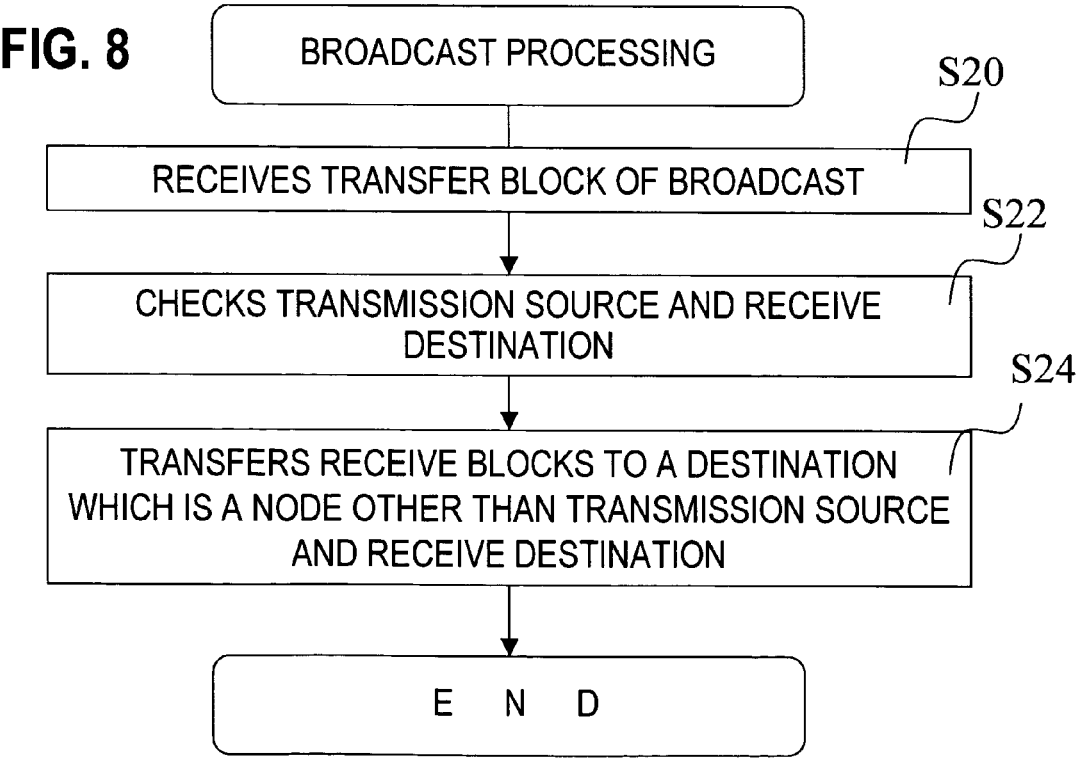
FIG. 8 is a flow chart depicting the processing of the transfer destination node according to the first embodiment in FIG. 5.

FIG. 5 is a diagram depicting the first embodiment of the broadcast processing of the present invention, FIG. 6 is a diagram depicting the data flow of the broadcast transfer in FIG. 5, FIG. 7 is a flow chart depicting the processing of the data transfer source node in FIG. 5, and FIG. 8 is a flow chart depicting the processing of the data receive source node.

As FIG. 5 shows, the node 10 divides the transmission block and transfers the divided transmission blocks to each node 11, 12 and 13 via separate network adapters 14A, 14B and 14C, as shown in sign (1). Then each node 11, 12 and 13, which received the data, transfers the received divided data to a plurality of nodes which do not receive the divided data, as shown in sign (2).

Figure 13:
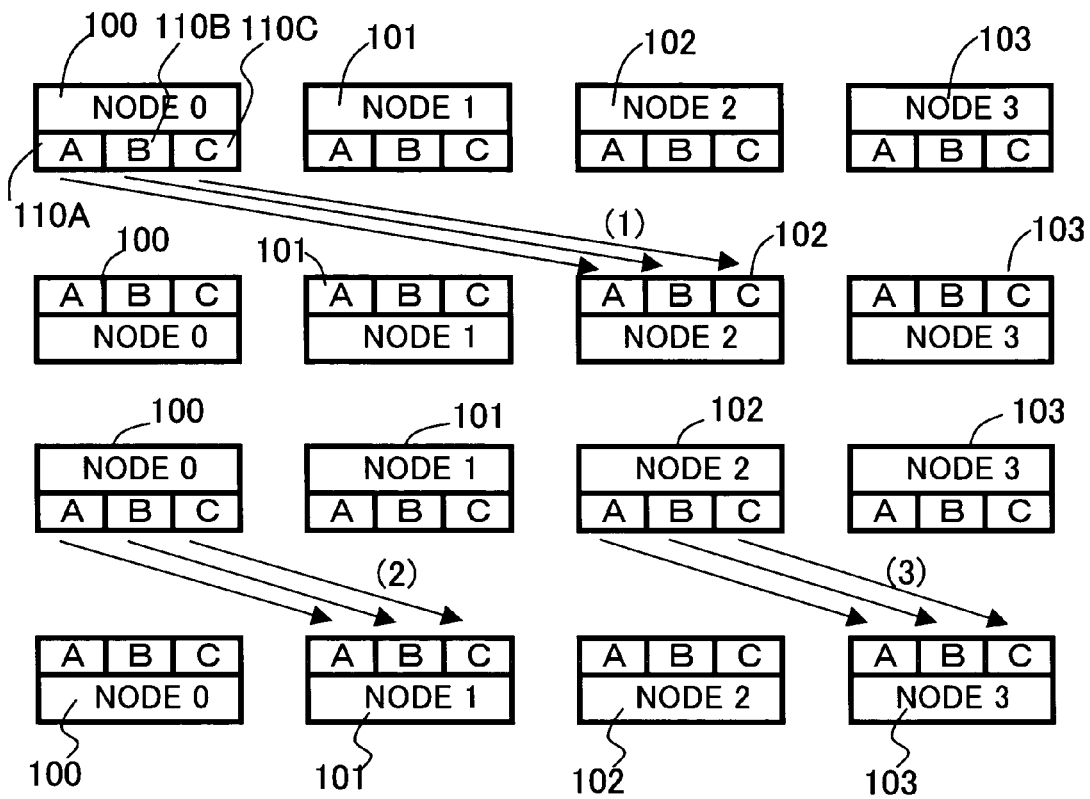
FIG. 13 is a diagram depicting the broadcast processing according to the second prior art.
Figure 14:
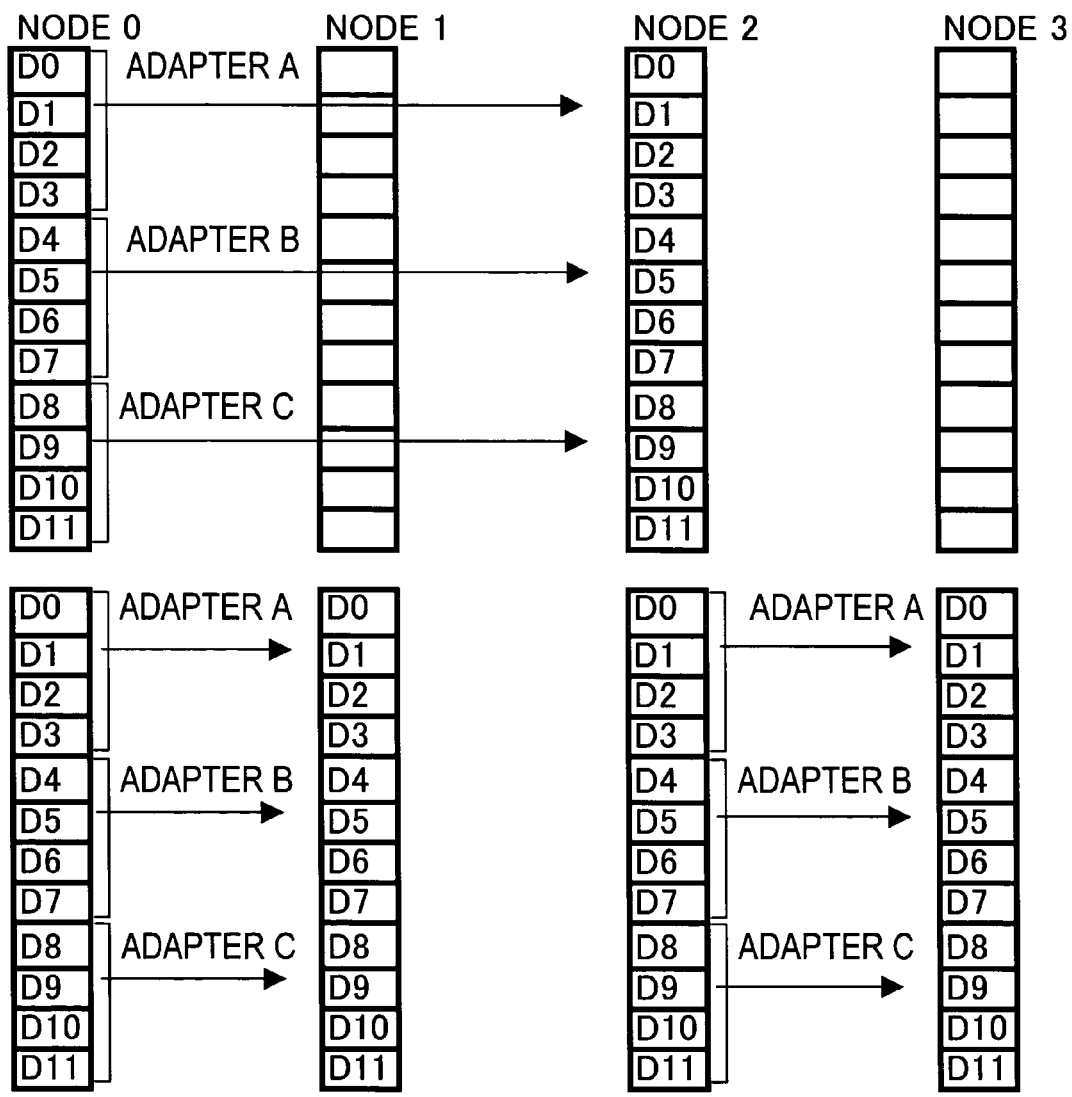
FIG. 14 is a diagram depicting the data flow in FIG. 13.

This data transfer will be described with reference to FIG. 6, using an example of transferring the same data transfer volume in FIG. 13 and FIG. 14. In other words, an example when the node 10 broadcasts 12 blocks of data D0 to D11 to the other three nodes 11, 12 and 13 will be described. First node 10 divided the 12 blocks of data D0 to D11 into four. The 3 blocks of data D0 to D2, D3 to D5 and D6 to D8 are transferred from each network adapter 14A, 14B and 14C of the node 10 to the corresponding network adapters 14A, 14B and 14C of the nodes 11, 12 and 13 respectively.

The node 11 which received three blocks of data D0 to D2 transfers the received three blocks of data D0 to D2 from the two network adapters 14A and 14B to the network adapters 14A and 14B of the nodes 12 and 13 which do not receive the data D0 to D2.

In the same way, the node 12 which received the three blocks of data D3 to D5 transfers the received three blocks of data D3 to D5 from the two network adapters 14A and 14C to the network adapters 14A and 14C of the nodes 11 and 13 which do not receive the data D3 to D5.

The node 13 which received the three blocks of data D6 to D8 transfers the received three blocks of data D6 to D8 from the two network adapters 14B and 14C to the network adapters 14B and 14C of the nodes 11 and 12 which do not receive the data D6 to D8.

Along with this, the node 10 transfers the remaining three blocks of data D9 to D11, which is not transferred in the first transfer, from the three network adapters 14A, 14B and 14C to the network adapters 14A, 14B and 14C of the nodes 11, 12 and 13.

In this way, the transfer source node 10 divides the transfer data to be broadcasted, and transfers each divided data separately from the node 10 to the nodes 11, 12 and 13, then the node 10 transfers the remaining data to each node 11, 12 and 13. Along with this, the nodes 11, 12 and 13 transfer the received data to the nodes 11, 12 and 13 other than node 10.

In this way, according to the present invention, more nodes (network adapters) participate in the data transfer in the second data transfer, so high-speed transfer processing can be implemented, and the transfer processing time during broadcast can be decreased.

In other words, according to the above mentioned second prior art, all the data is transferred from the transfer source node 10 to one other node 12 in the first transfer, and in the second transfer, all the data is transferred from the two nodes 10 and 12, which have all the data, to the other two nodes 11 and 13, so six network adapters participate in the transfer operation in the second transfer.

Whereas in the case of the present embodiment, data divided into four is transferred from the transfer source node 10 to the other three nodes 11, 12 and 13 in the first transfer, and in the second transfer, necessary data is transferred from all the nodes 10, 11, 12 and 13 to the other two nodes 11, 12 and 13, so nine network adapters participate in the transfer operation in the second transfer. If the total data volume to be transferred is the same, data transfer completes more quickly as more network adapters transfer data.

In other words, data is divided in the first data transfer, and the divided data is transferred separately to a plurality of nodes so that more nodes can participate in the second data transfer. And each node transfers the received divided data to nodes which do not receive the data.

For example, comparing the transfer time with respect to the total transfer volume of the entire network between the first and second prior arts and the present embodiment, the first prior art is total transfer volume×1=1, the second prior art is total transfer volume÷3×2=⅔, and the present embodiment is total transfer volume+4×2=½. Therefore in the present embodiment, broadcast transfer can be performed in ½ the time of the first prior art, and at ¾ the time of the second prior art.

In the present embodiment, in the second transfer, the transfer relationship of the transmission network adapter and the receive network adapter is selected so as to prevent an overlap of the network adapters. For example, in the second transfer, when the node 10 performs data transfer with the network adapter 14A of the node 11, the network adapter 14B of the node 12, and the network adapter 14C of the node 13, then the node 11 performs data transfer with the network adapter 14A of the node 12 and the network adapter 14B of the node 13, and the node 12 performs data transfer with the network adapter 14C of the node 11 and the network adapter 14A of the node 13, and the node 13 performs data transfer with the network adapter 14B of the node 11 and the network adapter 14C of the node 12.

By this, an overlap of network adapters can be prevented.

FIG. 7 is a flow chart depicting the processing of the transfer source node.

(S10) The CPU 40 of the transfer source node 10 divides the broadcast data block into a plurality of transfer blocks. If the divisor is the number of transfer destination nodes or the number of network adapters, the above mentioned effect of the second transfer can be exhibited at the maximum level.

(S12) Then the CPU 40 of the transfer source node 10 instructs the network adapters 14A, 14B and 14C to transfer the divided transfer blocks to separate nodes 11, 12 and 13. By this, the network adapters 14A, 14B and 14C of the node 10 transfer the divided transfer blocks to the network adapter 14A of the node 11, the network adapter 14B of the node 12, and the network adapter 14C of the node 13.

FIG. 8 is a flow chart depicting the processing of the receive source node.

(S20) When a broadcast block is received, the receive source nodes 11, 12 and 13 recognize the broadcast data by the frame type (see FIG. 4) of the frame.

(S22) The receive source nodes 11, 12 and 13 check the destination address and the transmission source address (see FIG. 4) of the frame, and decides the transfer destinations other than this.

(S24) Each receive source node 11, 12 and 13 transfers the received transfer block to the transfer destination which is the node where the transfer block should be transferred. At this time, a network adapter, predetermined in each node, is used to prevent an overlap use of the network adapters.

In this way, the broadcast transfer time can be easily decreased by the CPU 40 of each node 10, 11, 12 and 13, dividing data and performing transfer processing.

Second Embodiment

Figure 9:
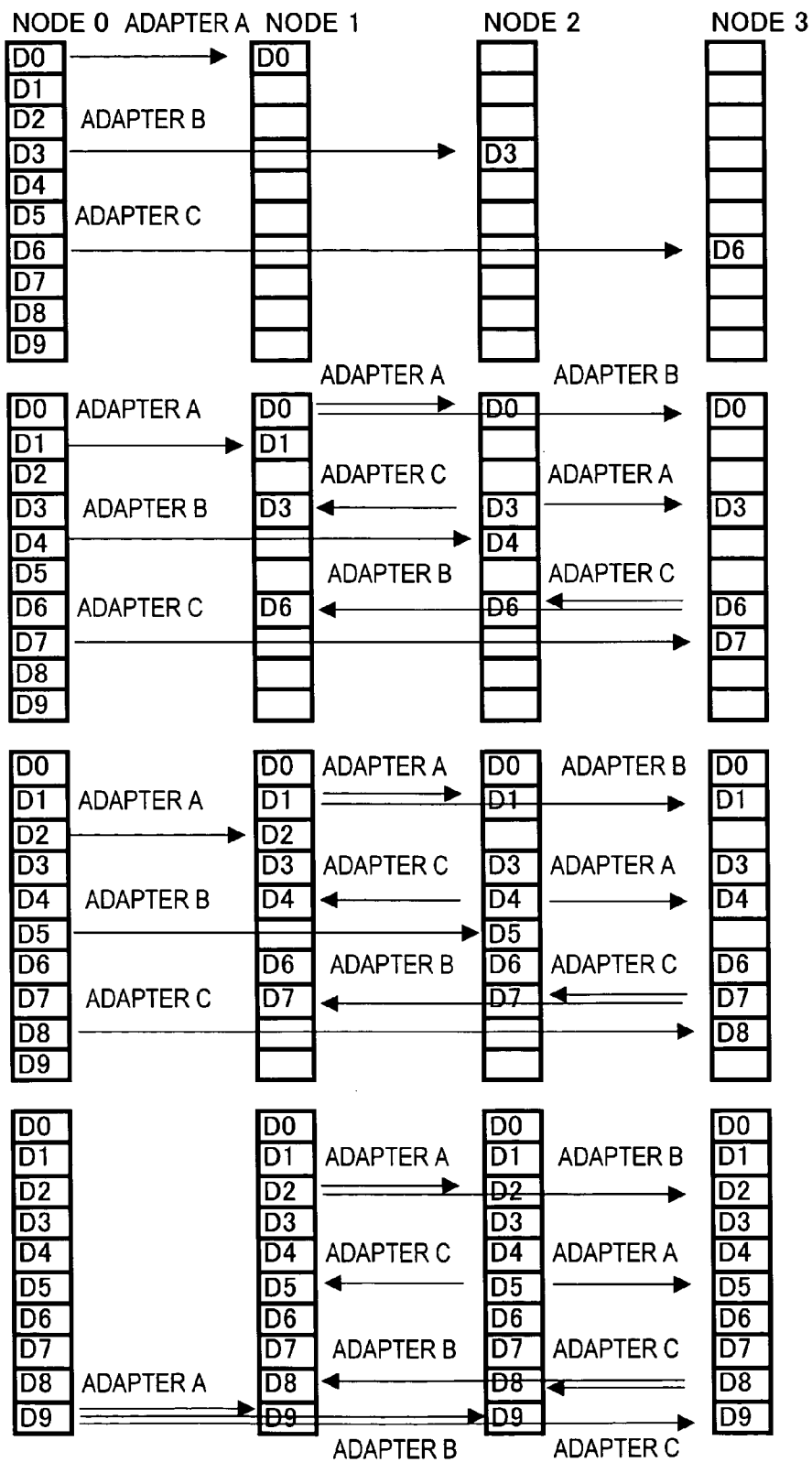
FIG. 9 is a diagram depicting the broadcast processing according to the second embodiment of the present invention.

FIG. 9 is a diagram depicting the broadcast processing according to the second embodiment of the present invention.

In this embodiment, broadcast processing is executed at a higher speed by overlapping the two times of data transfer in the first embodiment. FIG. 9 is an example when the node 10 broadcasts 10 blocks of data D0 to D9 to the other three nodes 11, 12 and 13.

First, the node 10 divides the data to be broadcasted into 10, D0 to D9. Each one block of data D0, D3 and D6 is transferred from each network adapter 14A, 14B and 14C of the node 10 to the corresponding network adapter 14A, 14B and 14C of the nodes 11, 12 and 13.

In the second transfer, each one block of data D1, D4 and D7 is transferred from each network adapter 14A, 14B and 14C of the node 10 to the corresponding network adapter 14A, 14B and 14C of the nodes 11, 12 and 13.

At the same time, the node 11 which received one block of data D0 transfers the received one block of data D0 from the two network adapters 14A and 14B to the network adapters 14A and 14B of the nodes 12 and 13 which do not receive the data D0.

In the same way, the node 12 which received one block of data D3 transfers the received one block of data D3 from the two network adapters 14A and 14C to the network adapters 14A and 14C of the nodes 13 and 11 which do not receive the data D3.

Also the node 13 which received one block of data D6 transfers the received one block of data D6 from the two network adapters 14B and 14C to the network adapters 14B and 14C of the nodes 11 and 12 which do not receive the data D6.

In the third data transfer, each one block of data D2, D5 and D8 is transferred from each network adapter 14A, 14B and 14C of the node 10 to the corresponding network adapter 14A, 14B and 14C of the nodes 11, 12 and 13.

At the same time, the node 11 which received one block of data D1 in the second transfer transfers the received one block of data D1 from the two network adapters 14A and 14B to the network adapters 14A and 14B of the nodes 12 and 13 which do not receive the data D1.

In the same way, the node 12 which received one block of data D4 transfers the received one block of data D4 from the two network adapters 14A and 14C to the network adapters 14A and 14C of the nodes 13 and 11 which do not receive the data D4.

Also the node 13 which received one block of data D7 transfers the received one block of data D7 from the two network adapters 14B and 14C to the network adapters 14B and 14C of the nodes 11 and 12 which do not receive the data D7.

In the fourth transfer, one block of data D9 is transferred from each network adapter 14A, 14B and 14C of the node 10 to the corresponding network adapter 14A, 14B and 14C of the nodes 11, 12 and 13.

At the same time, the node 11 which received one block of data D2 in the third transfer transfers the received one block of data D2 from the two network adapters 14A and 14B to the network adapters 14A and 14B of the nodes 12 and 13 which do not receive the data D2.

In the same way, the node 12 which received one block of data D5 transfers the received one block of data D5 from the two network adapters 14A and 14C to the network adapters 14A and 14C of the nodes 13 and 11 which do not receive the data D5.

Also the node 13 which received one block of data D8 transfers the received one block of data D8 from the two network adapters 14B and 14C to the network adapters 14B and 14C of the nodes 11 and 12 which do not receive the data D8.

In this way, the transfer source node 10 further divides the transfer data to be broadcasted, and each divided data is separately transferred from the node 10 to the nodes 11, 12 and 13, then the node 10 transfers the remaining data after division to each node 11, 12 and 13, and the nodes 11, 12 and 13 transfer the received data to nodes 11, 12 and 13 other than node 10.

In this example, the transfer data is sub-divided, so four times of transfer is required, but whereas the transfer time in the first embodiment, in which the number of times of transfer is two, is total transfer volume÷4×2=$\frac{2}{4}$, it is total transfer volume÷10×4=$\frac{4}{10}$ in the second embodiment. Therefore compared with the first embodiment, the time required for broadcast in the second embodiment is about $\frac{4}{5}$.

Third Embodiment

Figure 10:
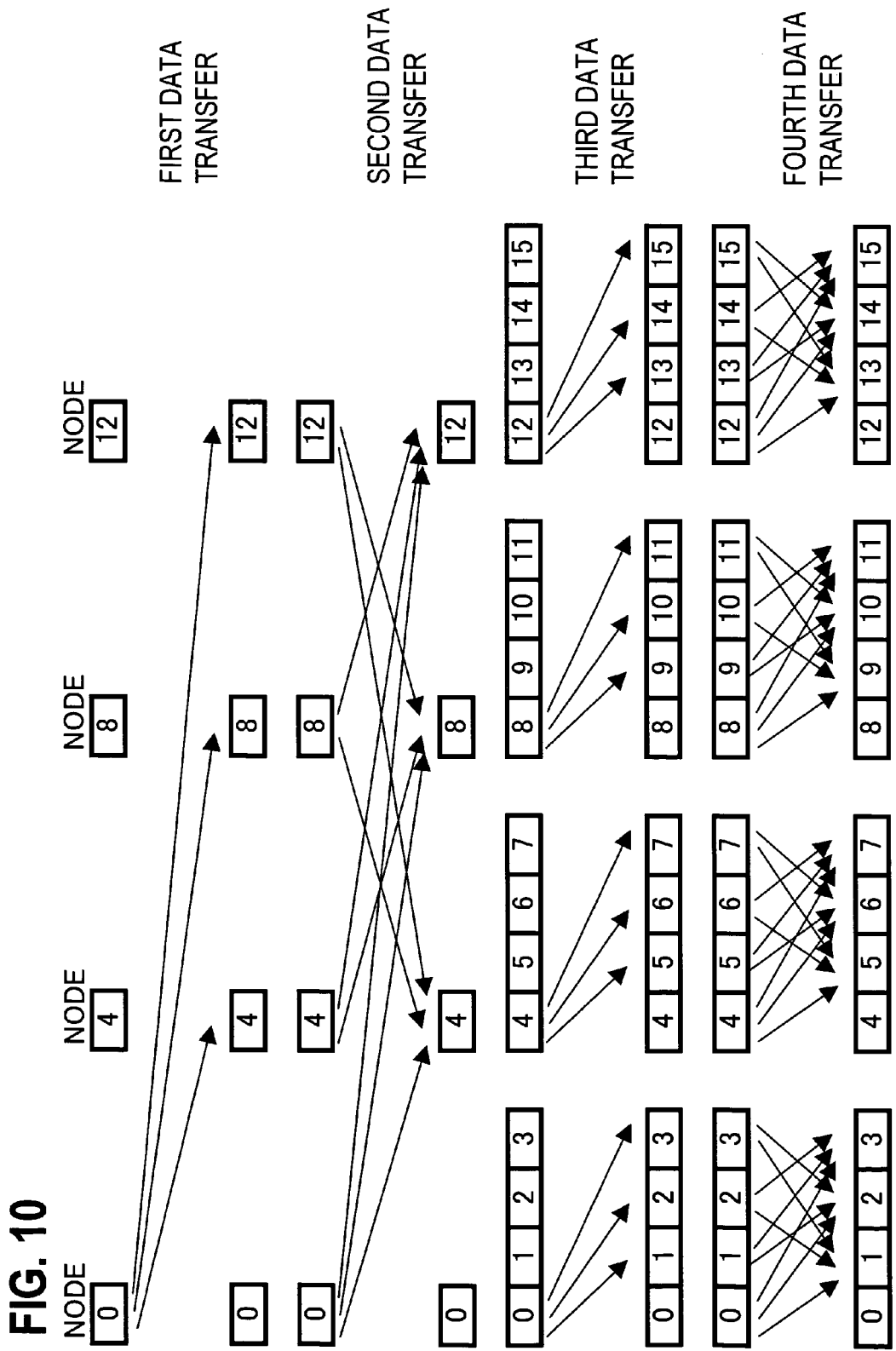
FIG. 10 is a diagram depicting the broadcast processing according to the third embodiment of the present invention.
Figure 11:
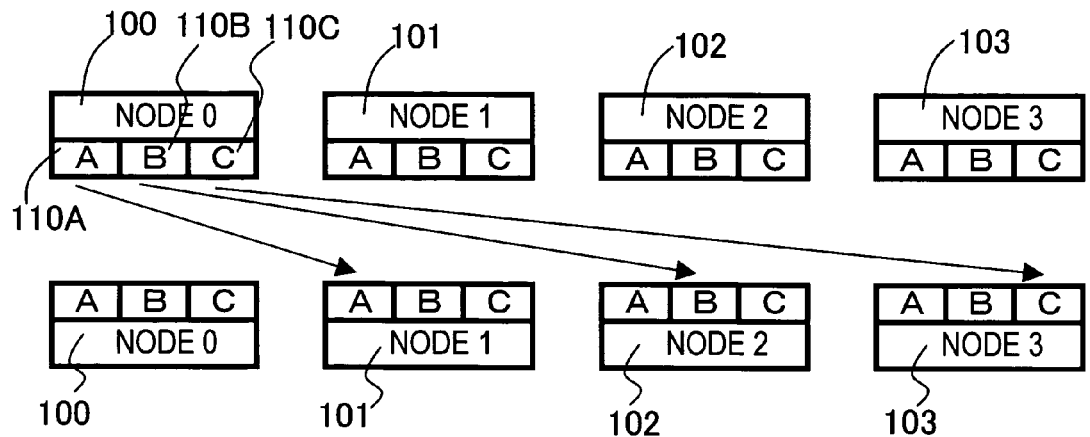
FIG. 11 is a diagram depicting the broadcast processing according to the first prior art.
Figure 12:
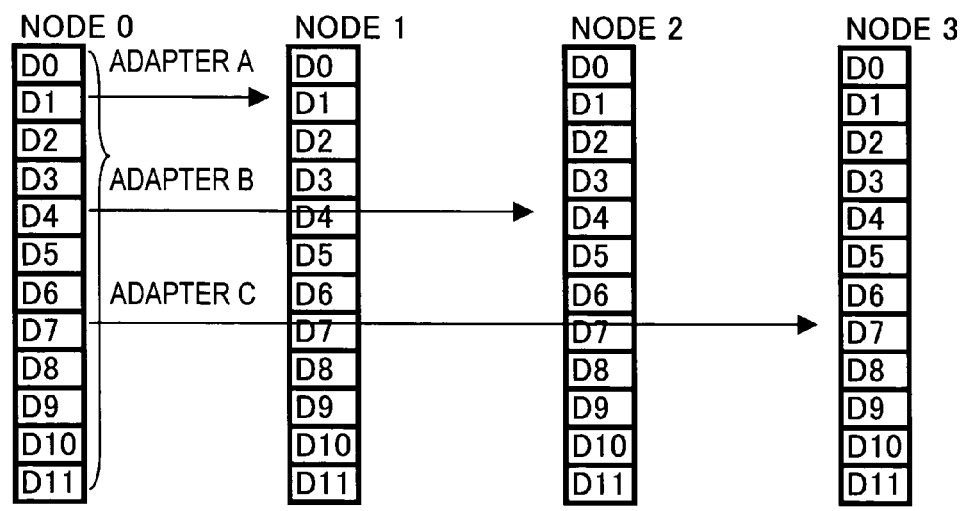
FIG. 12 is a diagram depicting the data flow in FIG. 11.

FIG. 10 is a diagram depicting the broadcast processing according to the third embodiment of the present invention. In this embodiment, data is broadcasted from the node 0 to nodes 1 to 15, in a network system comprised of 16 nodes 0 to 15, each of which has three network adapters.

First, in the same manner as the first embodiment which four nodes 0, 4, 8, 12 are target nodes, the node 0 divides the 12 blocks of data D0 to D11 into four. Each network adapter 14A, 14B and 14C of the node 0 transfers each three blocks of data D0 to D2, D3 to D5 and D6 to D8 to the corresponding network adapter 14A, 14B and 14C of the nodes 4, 8 and 12.

Then the second transfer is started, where the node 4 which received the three blocks of data D0 to D2 transfers the received three blocks of data D0 to D2 from the two network adapters 14A and 14B to the network adapters 14A and 14B of the nodes 8 and 12 which do not receive the data D0 to D2.

In the same way, the node 8 which received three blocks of data D3 to D5 transfers the received three blocks of data D3 to D5 from the two network adapters 14A and 14C to the network adapters 14A and 14C of the nodes 4 and 12 which do not receive the data D3 to D5.

Also the node 12 which received three blocks of data D6 to D8 transfers the received three blocks of data D6 to D8 from the two network adapters 14B and 14C to the network adapters 14B and 14C of the nodes 4 and 8 which do not receive the data D6 to D8.

At the same time, the node 0 transfers the remaining three blocks of data D9 to D11, which is not transferred in the first transfer, from the three network adapters 14A, 14B and 14C to the network adapters 14A, 14B and 14C of the nodes 4, 8 and 12.

By this, as described in the first embodiment, four nodes 0, 4, 8 and 12 hold 12 blocks of data. In the third transfer, the node 0 performs the data transfer operation for nodes 1 to 3, the node 4 for nodes 5 to 7, the node 8 for the nodes 9 to 11 and the node 12 for the nodes 13 to 15, in the same way as the first data transfer.

In the fourth data transfer, a transfer operation, the same as the second data transfer, is performed as nodes 0 to 3, 4 to 7, 8 to 11 and 12 to 15 as groups.

In this way, the maximum number of nodes that can be broadcasted in one transfer is the same as the number of network adapters, and if the number of nodes further increases, the second data transfer is performed in two steps, three steps and the like, so the number of nodes that can be broadcasted can be increased. In the case of a network system with 256 nodes, 8 times of data transfer is performed.

Other Embodiments

In the above embodiments, a network system with four nodes was used for description, but the present invention can be applied to a network system having three or more nodes. The configuration of the node described above was a computer unit having a CPU, memory, etc, but other configuration may be used.

Also the network system was described as a parallel computer, but the present invention can also be applied to other distributed processing systems and communication systems. The format of a transmission path is not limited to Ethernet™, but other network protocols can be applied.

The transfer source node divides the transfer data to be broadcasted, and transfers each divided data separately from the transfer source node to a plurality of other nodes, then the plurality of other nodes which received the transfer data transfers the received data to the nodes other than the transfer source node. In this way, more nodes (network adapters) can participate in data transfer in the second data transfer, so high-speed transfer processing can be implemented, and transfer processing time for broadcast can be decreased.

What is claimed is:

1. A network system comprising:
    N (N=three or more) number of node groups each of which has N-1 number of network adapters; and
    a cross bar switch which connects the corresponding network adapters of each of said node groups, the corresponding network adapters being predetermined,
    wherein one node group of said N number of node groups comprises a CPU (Central Processing Unit) that divides data to be transferred to a plurality of other node groups into N number of data, and instructs parallel transfer of each of N-1 number of data except one data among said divided N number of data to said N-1 number of network adapters from each network adapter of said one node group to the corresponding network adapter of said plurality of other node groups via said cross bar switch respectively,
    and wherein each of said plurality of other node groups, which received said divided data, parallel transfers said received divided data to said plurality of other node groups, which have not received said divided data, from each network adapter of said other node groups to the corresponding network adapter of said plurality of other node groups via said cross bar switch respectively,
    and wherein said one node group parallel transfers said one data to said plurality of other node groups from each network adapter of said one node group to the corresponding network adapter of said plurality of said other node groups via said cross bar switch respectively.

2. The network system according to claim 1, wherein one node group divides said data to be transferred into said N number of data by a divisor according to the number of said network adapters, to create said divided data.

3. The network system according to claim 1, wherein said one node group transfers each of said divided data to said plurality of other nodes in a plurality of times of transfer and divides the data by a divisor according to the number of said network adapters and the number of the times of transfer, to create said divided data.

4. The network system according to claim 1, wherein said cross bar switch comprises a N-1 number of cross bar switches,
    wherein each of said network adapters is connected with corresponding cross bar switch of said N-1 number of cross bar switches.

5. The network system according to claim 1, wherein said N number of node groups comprises a parallel computer system for executing parallel calculation according to the parallel transfer.

6. A broadcast processing method for a network system for broadcasting data from one node group having N-1 (N=three or more) number of network adapters to a N-1 number of other node groups each of which has N-1 number of network adapters, comprising:
    a step that a CPU (Central Processing Unit) of said one node group divides data to be transferred to said plurality of other node groups into N number of data;
    a first step that the CPU of said one node group instructs parallel transfer of each of N-1 number of data except one data among said divided N number of data to said N-1 number of network adapters from each network adapter of said one node group to a corresponding network adapter of said plurality of other node groups via a cross bar switch respectively, the corresponding network adapters being predetermined;
    a second step that each of said plurality of other node groups which received said divided data parallel transfers said received divided data to said plurality of other node groups which have not received said divided data from each network adapter to the corresponding network adapter of said plurality of other node groups via said cross bar switch respectively; and
    a third step that said one node group parallel transfers the one data of divided said N number of data, which is not transferred to said plurality of other node groups, to said plurality of other node groups from each network adapter of said one node group to the corresponding network adapter of said plurality of said other node groups via said cross bar switch respectively.

7. The broadcast processing method for a network system according to claim 6, wherein said dividing step comprises a step that a divisor of said one node group divides said data to be transferred into said N number of data according to the number of said network adapters, to create said divided data.

8. The broadcast processing method for a network system according to claim 7, wherein said dividing step further comprises a step that said divisor divides the data according to the number of said network adapters and the number of the times of transfer, to create said divided data.

9. The broadcast processing method for a network system according to claim 6, wherein said cross bar switch comprises a N-1 number of cross bar switches,
    wherein each of said network adapters is connected with corresponding cross bar switch of said N-1 number of cross bar switches.

10. The broadcast processing method for a network system according to claim 7, wherein said N number of node groups comprises a parallel computer system for executing parallel calculation according to the parallel transfer.

11. The network system according to claim 1, wherein said each of N number of node groups comprises a first node unit and other node units;
    and wherein each of said first node unit of said N-1 number of node groups transfers each of said N-1 number of data to said other node units of said N-1 number of node groups from each network adapter of said first node unit to the corresponding network adapter of said other node units via said cross bar switch,
    and each of said other node units which received said divided data transfers said received divided data to said other node units which have not received said divided data from each network adapter of said other node units to the corresponding network adapter of said other node units via said cross bar switch respectively,
    and wherein said first node unit transfers one data of divided said N number of data, which is not transferred to said other node units, to said other node units from each network adapter of said first node unit to the corresponding network adapter of said other node units via said cross bar switch respectively.

12. The broadcast processing method according to claim 6, said method further comprises;
   a fourth step that each of a first node unit of said N−1 number of node groups which comprises said first node unit and other node units transfers each of said N−1 number of data to said other node units of said N−1 number of node groups from each network adapter of said first node unit to the corresponding network adapter of said other node units via said cross bar switch;
   a fifth step that each of said other node units which received said divided data transfers said received divided data to said other node units which have not received said divided data from each network adapter of said other node units to the corresponding network adapter of said other node units via said cross bar switch respectively; and
   a sixth step that said first node unit transfers one data of divided said N number of data, which is not transferred to said other node units, to said other node units from each network adapter of said first node unit to the corresponding network adapter of said other node units via said cross bar switch respectively.

* * * * *